US012651216B2

(12) United States Patent
Wang et al.

(10) Patent No.: US 12,651,216 B2
(45) Date of Patent: Jun. 9, 2026

(54) METHOD, DEVICE, AND COMPUTER PROGRAM PRODUCT FOR DEVELOPMENT USING AGENTS

(71) Applicant: Dell Products L.P., Round Rock, TX (US)

(72) Inventors: Zijia Wang, London (GB); Zhen Jia, Shanghai (CN); Tianyu Ma, Shanghai (CN); Guangliang Lei, Shanghai (CN); Li Xie, Shanghai (CN); Yan Chen, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 140 days.

(21) Appl. No.: 18/675,973

(22) Filed: May 28, 2024

(65) Prior Publication Data

US 2025/0335837 A1     Oct. 30, 2025

(30) Foreign Application Priority Data

Apr. 25, 2024    (CN) .......................... 202410511024.7

(51) Int. Cl.
*G06Q 10/00* (2026.01)
*G06F 11/3668* (2025.01)
(Continued)

(52) U.S. Cl.
CPC .... *G06Q 10/06311* (2013.01); *G06F 11/3684* (2013.01); *G06F 40/30* (2020.01); *G06Q 10/04* (2013.01)

(58) Field of Classification Search
None
See application file for complete search history.

(56) References Cited

U.S. PATENT DOCUMENTS

2011/0060895 A1*  3/2011  Solomon ................... G06F 8/36
                                                      713/1
2012/0150531 A1*  6/2012  Bangalore ............... G06F 40/40
                                                      704/E11.001
(Continued)

OTHER PUBLICATIONS

LL Voss, DE Wilkins, D Israel, C Manning, D Jurafsky et al. (Faust: Flexible Acquistion and Understanding System for Text)—2013—apps.dtic.mil (Year: 2013).*

(Continued)

*Primary Examiner* — Hafiz A Kassim
(74) *Attorney, Agent, or Firm* — Ryan, Mason & Lewis, LLP

(57) ABSTRACT

A method in an illustrative embodiment includes determining, using a language model, a plurality of quantitative representations of a plurality of demands described in a natural language, and classifying the plurality of demands by clustering into a plurality of tasks based on the plurality of quantitative representations. The method further includes determining, using the language model, a quantitative representation of each task among the plurality of tasks and a quantitative representation of each agent among a plurality of agents, and assigning the plurality of tasks respectively to corresponding agents among the plurality of agents based on the quantitative representation of each task and the quantitative representation of each agent. In embodiments of the present disclosure, demand analysis and task assignment are performed on natural language demands by using a language model, which can achieve efficient matching between tasks and agents.

20 Claims, 6 Drawing Sheets

(51) Int. Cl.
  G06F 40/30 (2020.01)
  G06Q 10/04 (2023.01)
  G06Q 10/0631 (2023.01)

(56) References Cited

U.S. PATENT DOCUMENTS

| | | | | |
|---|---|---|---|---|
| 2016/0070696 | A1* | 3/2016 | Lavallee | G06F 16/90332 |
| | | | | 704/9 |
| 2017/0024310 | A1* | 1/2017 | Andrejko | G06F 11/3698 |
| 2017/0185939 | A1* | 6/2017 | Volkov | G06Q 30/0185 |
| 2018/0121533 | A1* | 5/2018 | Magnani | G06F 16/248 |
| 2019/0042744 | A1* | 2/2019 | Rajasekharan | G06F 21/565 |
| 2019/0197109 | A1* | 6/2019 | Peters | G06N 3/096 |
| 2020/0019393 | A1* | 1/2020 | Vichare | G06N 20/00 |
| 2021/0349748 | A1* | 11/2021 | Dunfey | G06F 3/065 |
| 2021/0357752 | A1* | 11/2021 | Chen | G06F 40/20 |
| 2022/0108240 | A1* | 4/2022 | Liposky | G06Q 10/0635 |
| 2024/0143928 | A1* | 5/2024 | Zorn | G06F 40/56 |
| 2024/0354792 | A1* | 10/2024 | Chiang | G06Q 30/0204 |
| 2025/0005282 | A1* | 1/2025 | Moriarty | G06F 16/345 |
| 2025/0061290 | A1* | 2/2025 | Gardner | H04L 51/04 |
| 2025/0086024 | A1* | 3/2025 | Naanaa | G06Q 10/06311 |
| 2025/0181576 | A1* | 6/2025 | Tyagi | G06F 16/248 |
| 2025/0232125 | A1* | 7/2025 | Ma | G06Q 30/01 |
| 2025/0272652 | A1* | 8/2025 | Makhija | G06F 40/205 |

OTHER PUBLICATIONS

O Mirzaei, MR Akbarzadeh-T et al. (A novel learning algorithm based on a multi-agent structure for solving multi-mode resource-constrained project scheduling problem)—Journal of Convergence, 2013—0m1d.com (Year: 2013)*

K. Erol et al., "HTN Planning: Complexity and Expressivity," AAAI-94 Proceedings, Aug. 1994, pp. 1123-1128.

M. Allamanis et al., "A Survey of Machine Learning for Big Code and Naturalness," ACM Computing Surveys, vol. 51, No. 4, Jul. 2018, p. 81.1-81.37.

Z. Feng et al., "CodeBERT: A Pre-Trained Model for Programming and Natural Languages," arXiv:2002.08155v4, Sep. 18, 2020, 12 pages.

S. Chacon et al., "Pro Git," https://git-scm.com/book/en/v2, Version 2.1.413, Dec. 22, 2023, 501 pages.

J. M. Fuentes et al., "An Ontology-Based Approach to the Description and Execution of Composite Network Management Processes for Network Monitoring," 17th IFIP/IEEE International Workshop on Distributed Systems: Operations and Management, Oct. 2006, 13 pages.

G. Lilis et al., "A Secure and Distributed Message Oriented Middleware for Smart Building Applications," Automation in Construction, vol. 86, Feb. 2018, pp. 163-175.

V. Massol et al., "JUnit in Action," https://www.manning.com/books/junit-in-action?, Accessed Jan. 5, 2024, 3 pages, Abstract only.

M. Balog et al., "DeepCoder: Learning to Write Programs," 5th International Conference on Learning Representations, Apr. 2017, 20 pages.

J. F. Smart, "Jenkins: The Definitive Guide," O'Reilly, Jul. 2011, 8 pages, Table of Contents only.

I. Baldini et al., "Serverless Computing: Current Trends and Open Problems," arXiv: 1706.03178v1, Jun. 10, 2017, 20 pages.

M. V. L. N. Venugopal et al., "Serverless Through Cloud Native Architecture," International Journal of Engineering Research & Technology, vol. 10, No. 2, Feb. 2021, pp. 484-496.

A. M. Sami et al., "System for Systematic Literature Review using Multiple AI agents: Concept and an Empirical Evaluation," arXiv:2403.08399v1, Mar. 13, 2024, 13 pages.

B. Jiang et al., "Intelligent Image Semantic Segmentation: A Review Through Deep Learning Techniques for Remote Sensing Image Analysis," Journal of the Indian Society of Remote Sensing, vol. 51, No. 9, Sep. 2023, pp. 1865-1878.

* cited by examiner

METHOD, DEVICE, AND COMPUTER PROGRAM PRODUCT FOR DEVELOPMENT USING AGENTS

RELATED APPLICATION

The present application claims priority to Chinese Patent Application No. 202410511024.7, filed Apr. 25, 2024, and entitled "Method, Device, and Computer Program Product for Development Using Agents," which is incorporated by reference herein in its entirety.

FIELD

The present disclosure relates to the field of development, and more specifically relates to a method, device, and computer program product for development using multiple agents.

BACKGROUND

Development of a code-based modular software product is an important and challenging task that requires effective cooperation and coordination among a plurality of agents. Some methods and tools (e.g., demand analysis, task assignment, code integration, code testing, and code deployment) have been developed to support various aspects of this work. However, none of these methods and tools provides an integral and scalable solution.

Demand analysis is a process of understanding and interpreting requirements and functions of a code-based software product and is the basis of development. Natural language processing (NLP) technology can be used to extract and represent relevant information from a demand. However, NLP technology is often limited by the ambiguity, incompleteness, and inconsistency of the natural language. Further, NLP technology cannot capture the semantics and intention of a demand, which may lead to misunderstandings or omissions of important details.

SUMMARY

Embodiments of the present disclosure provide a method, device, and computer program product for development using multiple agents.

In a first aspect of embodiments of the present disclosure, a method is provided. The method includes: determining, using a language model, a plurality of quantitative representations of a plurality of demands described in a natural language; classifying the plurality of demands by clustering into a plurality of tasks based on the plurality of quantitative representations; determining, using the language model, a quantitative representation of each task among the plurality of tasks and a quantitative representation of each agent among a plurality of agents; and assigning the plurality of tasks respectively to corresponding agents among the plurality of agents based on the quantitative representation of each task and the quantitative representation of each agent.

In a second aspect of embodiments of the present disclosure, an electronic device is provided. The electronic device includes at least one processor and a memory coupled to the at least one processor and having instructions stored therein. The instructions, when executed by the at least one processor, cause the electronic device to perform actions. The actions include: determining, using a language model, a plurality of quantitative representations of a plurality of demands described in a natural language; classifying the plurality of demands by clustering into a plurality of tasks based on the plurality of quantitative representations; determining, using the language model, a quantitative representation of each task among the plurality of tasks and a quantitative representation of each agent among a plurality of agents; and assigning the plurality of tasks respectively to corresponding agents among the plurality of agents based on the quantitative representation of each task and the quantitative representation of each agent.

In a third aspect of embodiments of the present disclosure, a computer program product is provided. The computer program product is tangibly stored on a non-transitory computer-readable medium and includes machine-executable instructions. The machine-executable instructions, when executed by a machine, cause the machine to perform actions. The actions include: determining, using a language model, a plurality of quantitative representations of a plurality of demands described in a natural language; classifying the plurality of demands by clustering into a plurality of tasks based on the plurality of quantitative representations; determining, using the language model, a quantitative representation of each task among the plurality of tasks and a quantitative representation of each agent among a plurality of agents; and assigning the plurality of tasks respectively to corresponding agents among the plurality of agents based on the quantitative representation of each task and the quantitative representation of each agent.

It should be understood that the content described in this Summary is neither intended to limit key or important features of embodiments of the present disclosure, nor intended to limit the scope of the present disclosure. Other features of the present disclosure will become readily understood with reference to the additional description herein.

BRIEF DESCRIPTION OF DRAWINGS

In conjunction with the drawings and with reference to the Detailed Description below, the above and other features, advantages, and aspects of embodiments of the present disclosure will become more apparent. Identical or similar reference numerals in the drawings represent identical or similar elements, in which.

DETAILED DESCRIPTION

Figure 1:
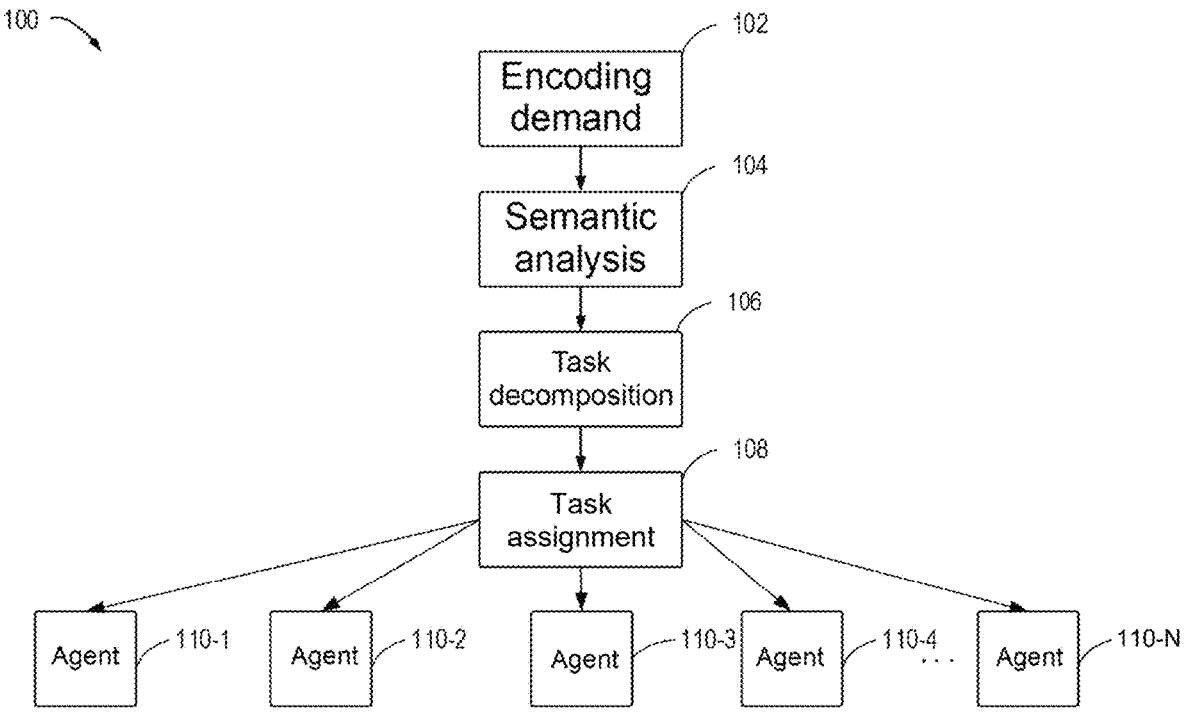
FIG. 1 is a schematic diagram of a process for modular software development using a scalable multi-agent arrangement according to an embodiment of the present disclosure.

Illustrative embodiments of the present disclosure will be described in more detail below with reference to the drawings. While some embodiments of the present disclosure are shown in the drawings, it should be understood that the present disclosure may be implemented in various forms, and should not be construed as being limited to the embodiments set forth herein. On the contrary, these embodiments are presented in order to provide a more thorough and complete understanding of the present disclosure. It should be understood that the drawings and embodiments of the present disclosure are only used as examples and are not intended to limit the scope of protection of the present disclosure.

In the description of embodiments of the present disclosure, the term "including" and similar wordings thereof should be construed as open-ended inclusions, i.e., "including but not limited to." The term "based on" should be construed as "at least partially based on." The term "an embodiment" or "the embodiment" should be construed as "at least one embodiment." The terms "first," "second," and the like may refer to different or identical objects. Other explicit and implicit definitions may be included below.

Demand analysis and task assignment are key first steps in software development. In order to overcome the ambiguity, incompleteness, and inconsistency of a natural language and to more accurately capture the semantics and intention of a demand to avoid misunderstanding or missing important details, it is first necessary to deeply understand and analyze the demand described in the natural language, and then convert the demand into an encoding task. Therefore, an attempt is made to use a language model in a software engineering task involving natural language understanding and generation. For example, a pre-trained model CodeBERT can encode both the natural language and a programming language, and can be applied to various downstream tasks, such as code summarization, code generation, and code search. However, CodeBERT neither specially solves the problem of demand analysis, nor provides a mechanism to convert a demand into a fine-grained encoding task that can be assigned to an agent based on the expertise of the agent.

A method for development using an agent provided in embodiments of the present disclosure uses a language model to perform demand analysis and task assignment on a demand described in a natural language. This method can perform semantic analysis on a plurality of demands to ensure an in-depth understanding of desired functions, can cluster and decompose these demands to obtain fine-grained encoding tasks, and then can strategically assign these tasks to agents based on expertise of the agents, thereby achieving the most efficient matching between tasks and agents.

In addition, in some embodiments, based on the characteristics and communication requirements of encoding modules, a scoring function that evaluates the suitability of the communication protocol of encoding modules can be further used to promote standardized communication between the encoding modules and dynamically select an optimal communication protocol, thus achieving fast and reliable code integration; the language model is used to ensure code consistency and compatibility and ensure the harmonious operation of the integrated encoding modules through a strict interface contract and a sandbox testing environment; an automatic algorithm is used to pre-solve a code conflict problem; through the cooperation of a real-time monitoring tool and an adaptive feedback loop, it is ensured that the encoding performance is continuously optimized; and continuous integration/continuous deployment (CI/CD) tools are integrated to ensure continuous optimization of encoding.

FIG. 1 is a schematic diagram 100 of a process for modular software development using a scalable multi-agent arrangement according to an embodiment of the present disclosure. As shown in FIG. 1, when modular software development is performed using the scalable multi-agent arrangement, it is first necessary to clarify encoding demands 102, such as a particular use object of to-be-developed software, a to-be-implemented target function, and an intended application scenario. These encoding demands 102 are generally described in natural language. The more detailed and specifically the encoding demands 102 are described, the more conducive it will be to the completion of subsequent tasks. After the encoding demands 102 are received, a language model is used to perform semantic analysis 104 on these encoding demands 102 described in the natural language. In the semantic analysis process, the plurality of encoding demands 102 can be classified into one or more clusters based on the mutual similarity thereof. During task decomposition 106, these clusters formed by the encoding demands 102 described in natural language are decomposed into a plurality of encoding tasks in a fine-grained manner. For a task among the plurality of tasks obtained through the decomposition, an agent that is most suitable for completing the task is selected from a plurality of agents, and then the task is assigned 108 to the agent. In this way, these tasks can be assigned one by one to agents 110-1, 110-2, 110-3, 110-4, ... 110-N, that are most suitable for completing the tasks. The number of agents may be constant, may vary, or may be increased dynamically as required. The process of demand analysis and task assignment will be described in detail below with reference to FIG. 2.

Figure 2:
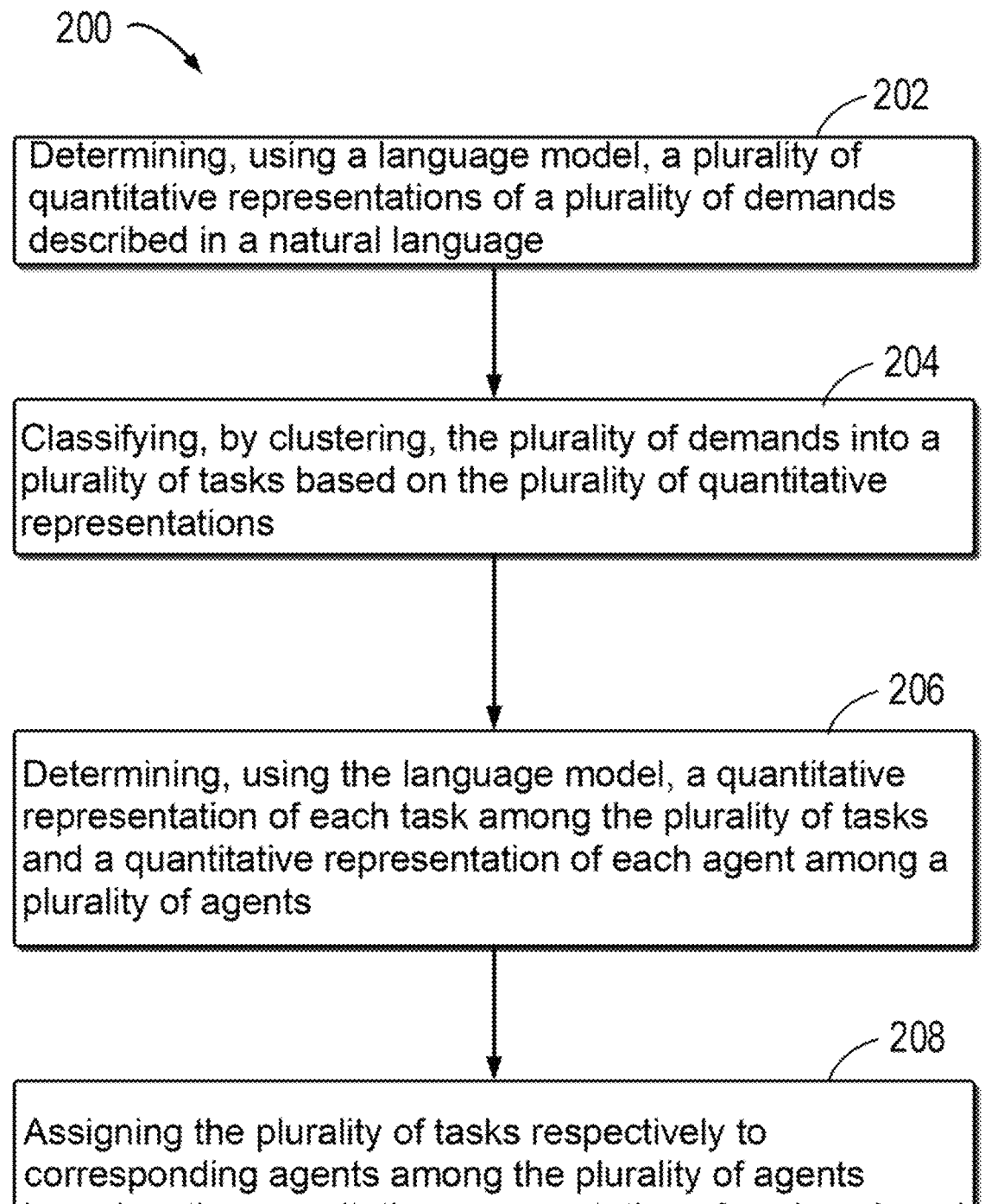
FIG. 2 is a flow chart of a method for demand analysis and task assignment using a language model according to an embodiment of the present disclosure.

FIG. 2 is a flow chart of a method 200 for demand analysis and task assignment using a language model according to an embodiment of the present disclosure. In order to ensure that the demands are clearly and explicitly understood and to prepare for subsequent processing, it is first necessary to analyze the encoding demands using a language model.

At step 202, quantitative representations of a plurality of demands described in the natural language are determined using a language model. This process can be implemented by performing, using a language model, semantic analysis on the plurality of demands described in the natural language and then converting them into vector representations. The demands can specify, for example, description of a to-be-developed product, description of a target function, an intended application scenario, etc. The language model is different from the natural language, and may be a pre-trained model based on mass data.

At step 204, the plurality of demands are classified by clustering into a plurality of tasks based on the plurality of quantitative representations. Based on the vector representations of the plurality of demands obtained at step 202, these demands can be grouped. For example, the grouping can be completed by a clustering algorithm such as K-means. By comparing the cosine similarity between two vectors, it is confirmed whether the demands corresponding to the two vectors are similar, which is used to determine whether the two demands can be classified into the same cluster. The higher the similarity, the more likely they will be clustered together. For each group obtained after clustering, the demands of the group can be decomposed into fine-grained tasks by identifying key semantic components and their relationship within the group.

After steps 202 and 204, the natural language demands are clustered into different groups, and the demands of each group are decomposed into fine-grained encoding tasks. Based on this, language model semantic understanding and optimization technology may then be used to match these fine-grained tasks with agents, to quickly and accurately assign these fine-grained tasks to appropriate agents, thereby improving the accuracy and efficiency of development.

At step 206, a quantitative representation of each task among the plurality of tasks and a quantitative representation of each agent among a plurality of agents are determined using the language model. The principles of the quantitative representation of tasks and the quantitative representation of agents are similar to the principle of the quantitative representation of the encoding demands 102. They each use a language model such as a pre-trained model to perform semantic analysis on the tasks and agents and then convert them into quantitative representations. Further, the determination of the quantitative representation of an agent may be completed at step 206, or may be completed at any one step prior to step 206, or even may be completed in advance before development begins. That is to say, the execution sequence is not limited to the sequence embodied in the figure. In some embodiments, in order to minimize development time, this step may be completed in advance before development begins. It is worth noting that the quantitative representation of an agent is obtained through semantic understanding and conversion using a language model based on a characteristic profile of the agent. The characteristic profile is sketched and summarized in the natural language based on the past project experience, area of expertise, performance index, and other aspects of the agent. Each agent in the development environment has a corresponding characteristic profile that is usually pre-generated and, in illustrative embodiments, may be updated in real time or regularly with the update or iteration of the agent.

At step 208, the plurality of tasks are assigned respectively to corresponding agents among the plurality of agents based on the quantitative representation of each task and the quantitative representation of each agent. For each task, based on a comparison between the quantitative representation of the task and quantitative representations of the characteristic profiles of the agents, the agent with the greatest similarity is found, which is the agent best matching the task.

In an illustrative embodiment, in order to ensure the efficiency of the overall project, an optimization algorithm may be further used to minimize the overall project completion time. This can be modeled as a linear programming problem, and is intended to minimize the sum of task completion time under boundary constraint conditions. The boundary constraint conditions include, e.g., agent availability and task correlation. For example, when task Ti is matched with an agent Aj and the similarity value between Ti and Aj is 1, task Ti can be directly assigned to agent Aj without performing remaining computations and comparisons for task Ti. Further, agent Aj is annotated as unavailable and is eliminated from subsequent comparisons, that is, other tasks are no longer compared with agent Aj, thereby reducing the time of this process.

In an illustrative embodiment, after the task is completed, feedback can be collected and used to update the characteristic profile of agent A, to ensure that the system can continuously learn and adapt to the dynamic characteristics of software development.

For example, assuming now that a demand S is given, its vector representation $V_s$ may be computed as:

$$V_s = \text{Encoder}(S) \qquad (1)$$

where Encoder is a function that converts a demand into a dense vector using a pre-trained model, such as a BERT model, where BERT denotes Bidirectional Encoder Representations from Transformers.

Then, these demands S are grouped based on the vector representations computed based on Equation (1), for example, by a clustering algorithm such as K-means, where the distance indicator is the cosine similarity between vectors for comparing whether directions between two vectors are similar, and it measures the similarity between the two vectors by computing the angle cosine between them. For a group of demands $\{S_1, S_2, \ldots, S_n\}$, the similarity between any two demands $S_i$ and $S_j$ can be expressed by Equation (2):

$$sim(S_i, S_j) = \frac{V_{S_i} \cdot V_{S_j}}{\|V_{S_i}\|\|V_{S_j}\|} \qquad (2)$$

$\|V_{S_i}\|$ is a vector modulus, sim $(S_i, S_j)$ is the similarity between the two vectors, and its value range is $[-1, 1]$. The closer the value is to 1, the more similar the two vectors are.

Now, the natural language demands are clustered into different groups, and the demands of each group are decomposed into fine-grained encoding tasks. For each task T, the best matching agent A* will be selected based on the cosine similarity between the vector of task T and the vector of a profile of agent A, to complete the task. Agent A* assigned with task T is:

$$A^* = \underset{A}{\arg\max} \frac{V_T \cdot V_A}{\|V_T\|\|V_A\|} \qquad (3)$$

where arg max is a function for finding a maximum value, and represents, in Equation (3), the corresponding A when the maximum value is found in the value set of cosine similarity $$\frac{V_T \cdot V_A}{\|V_T\|\|V_A\|},$$

and $V_T$ and $V_A$ are the vector representations of task T and agent A respectively.

Similar to the vectorization process of encoding demands 102, each task T obtained through decomposition and agent A are converted into a vector representation using a language model (step 206), where:

$$V_T = \text{Language model\_Encode}(T) \qquad (4)$$

$$V_A = \text{Language model\_Encode}(A) \qquad (5)$$

After agent A completes the encoding task T assigned to it, an encoding module will be generated.

Figure 3:
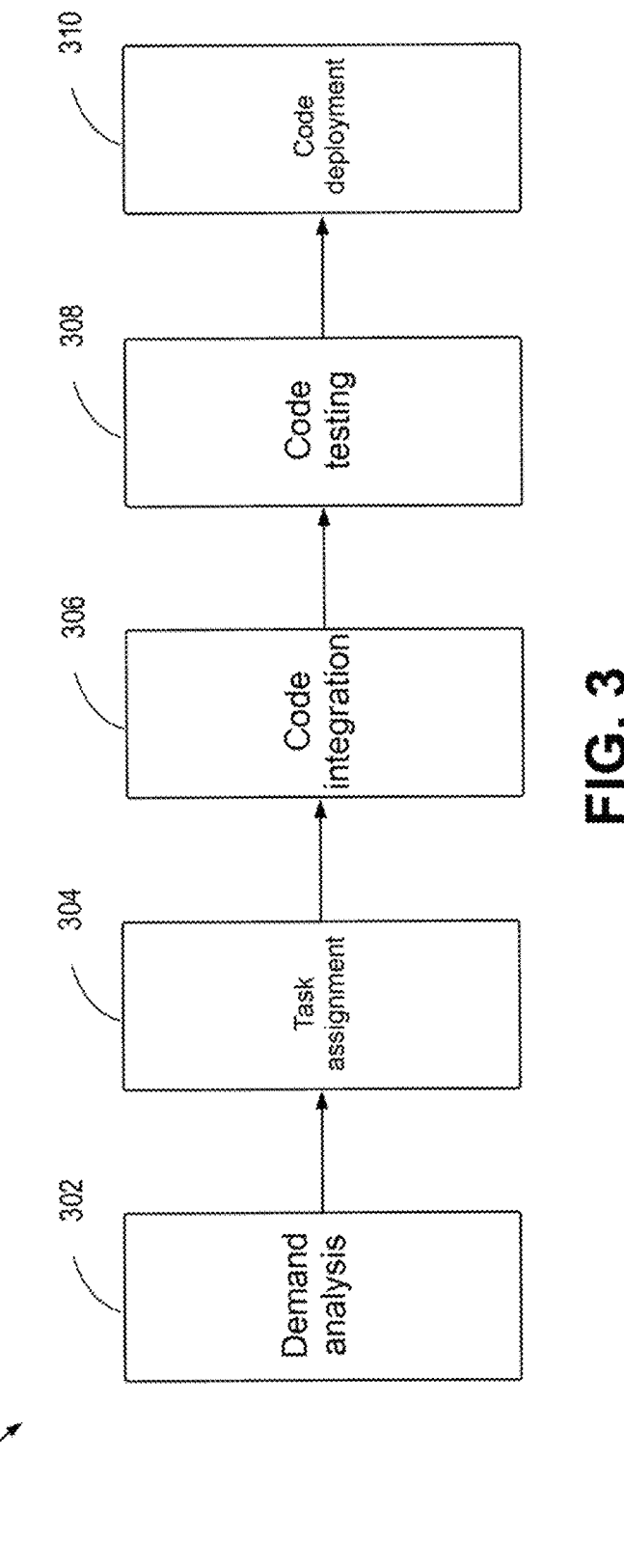
FIG. 3 is a flow chart of a method for software development according to an embodiment of the present disclosure.

Referring now to FIG. 3, a method 300 is shown. In the development process, in order to complete the overall task, the following steps are utilized: combining a plurality of encoding modules generated by different agents after completing the plurality of tasks into a code combination satisfying requirements of the demands (at 306); validating the function and quality of the encoding modules and the code combination (at 308); and selecting a deployment strategy to deploy the code combination to a terminal or client terminal (at 310), as shown in the method 300 of FIG. 3. The demand analysis and task assignment in respective steps 302 and 304 of FIG. 3 have been previously described in detail in conjunction with FIG. 2, and will not be further described here.

At 306, integration of the encoding modules generated after the plurality of agents complete the tasks begins. The encoding modules can be integrated dynamically, automatically, and seamlessly using middleware technology, the language model, and advanced software engineering practices.

Before integration, the language model will analyze the encoding modules to understand the functions corresponding to each function and the dependency relationship between modules, thereby ensuring that the semantics of each module can be understood in an automatic integration process. In order to ensure the invoking and connection between the modules in the integration process, an interface contract is strictly defined for each module, an expected input, an expected output, and an expected behavior are specified in detail, and the interface contract is strictly executed in the integration process, to ensure cross-module invoking of consistent functions and methods, and to presolve consistency and compatibility problems, where interface contract (M)={input (M), output (M), behavior (M)}. In addition, considering that, in the integration process, the modules further need to invoke and communicate with each other, it is further necessary to consider the selection of a communication protocol. In the method of the present application, the most appropriate communication protocol is further dynamically selected using a scoring function S(P, M) that evaluates the suitability of communication protocol P of encoding module M based on the properties and communication requirements of the encoding module.

During integration, conflicts may occur and cause failure in integration. In this case, a solution can be presented using the language model based on a semantic understanding of the conflicting code, or an optimal agent that can solve the conflict can be found from the agents through a method similar to task assignment. The solution is repeatedly attempted and iterated until all conflicts are solved.

After integration, the integrated encoding modules will be tested in a sandbox. The sandbox environment can isolate the integrated encoding modules from the system or environment where the test is run, so that if there is a problem in the test, it will not have any negative impact on the system or environment, thus achieving safe isolation. In addition, feedback in the integration process, especially feedback on conflict resolution and sandbox testing, can be collected for continuous improvement of the integration process.

Here, communication protocol P* selected to implement inter-module communication can be expressed by Equation (6):

$$P^* = \underset{P}{\mathrm{argmax}} S(P, M) \tag{6}$$

where P* is the corresponding communication protocol P when the maximum value is found using scoring function S (P, M).

At 308, the function and quality of the encoding submodules and integrated code are verified and validated. For the integrated encoding modules after the above sandbox testing, test cases required for subsequent testing can be generated using the language model based on the semantic understanding and associated descriptions of the code. For example, for a given integrated encoding module M a set of test cases $T_M$ can be generated: $T_M$=Language model_GenerateTests(M). When the test cases are executed, the performance and function of the integrated encoding module can be monitored in real time, and immediate feedback can be provided. The monitoring is mainly focused on key performance indicators, such as execution time, memory usage rate, and CPU usage rate. These indicators can be compared with predefined thresholds, to ensure that the code reaches optimal performance. Any deviation from the expected output will be flagged for subsequent review. After the testing is completed, feedback is provided to the developers based on the test results and performance indicators. This feedback can be used to perfect the integrated encoding module and continuously improve its quality. Further, in order to ensure that code integration will not introduce defects to the existing functions of the system, regression testing must be performed after each integration. The regression testing covers previously tested functions and ensures performance consistency. An automatic report is generated after testing, detailing the test results, the performance indicators, and discovered problems, to help with the review and improvement process. The method described above can ensure that the code testing at 308 is thorough, real-time, and continuously improved based on the feedback and the performance indicators.

At 310, the integrated encoding module is deployed to a terminal or client terminal. The code deployment process in some embodiments of the technical solutions of the present disclosure is seamless, automatic, and flexible. By integrating CI/CD tools with advanced deployment strategies, the solution ensures that the integrated encoding module is deployed effectively and reliably. This process will be described in detail below with reference to FIG. 4.

Figure 4:
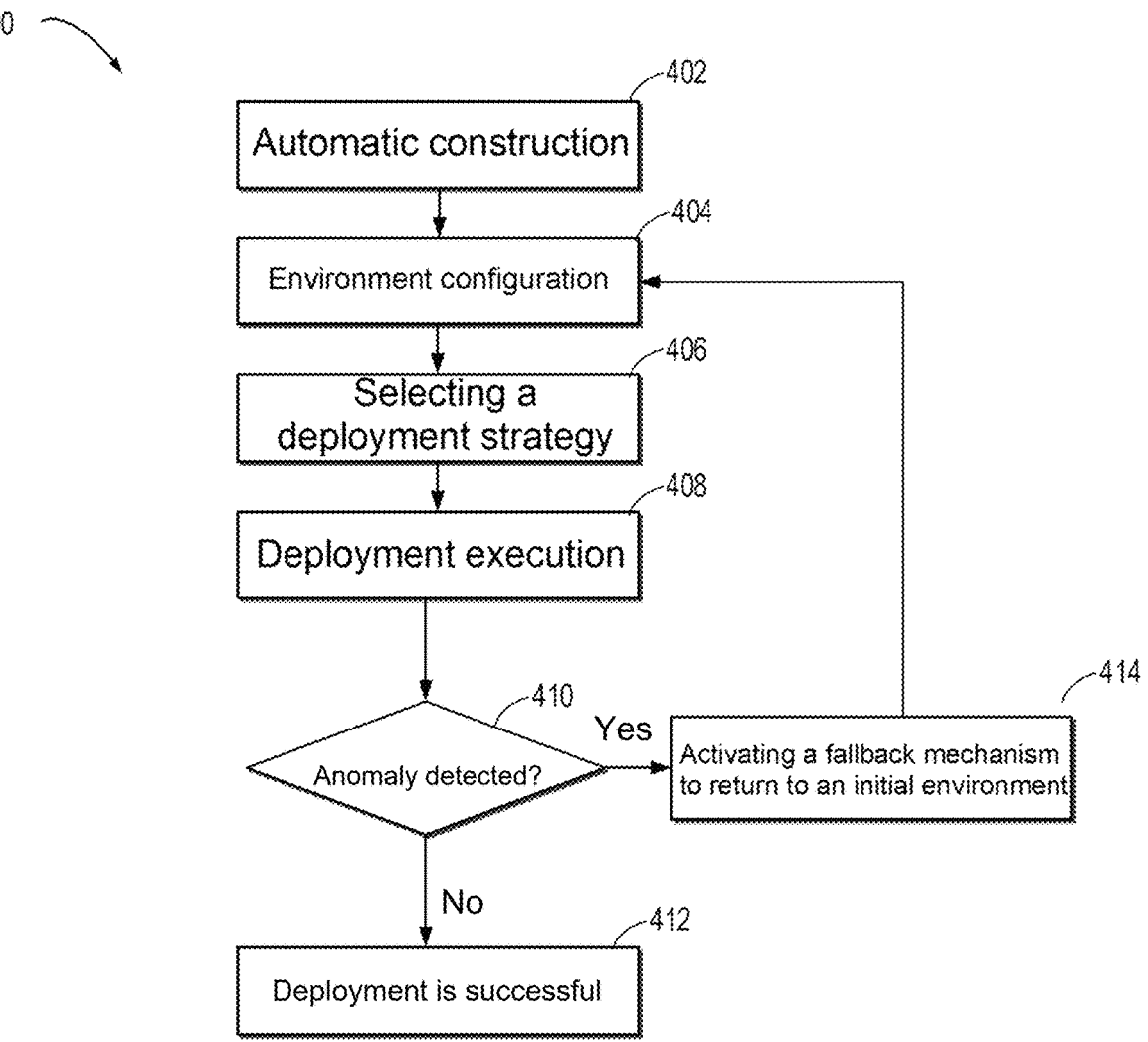
FIG. 4 is a flow chart of a method for code deployment with a fallback mechanism according to an embodiment of the present disclosure.

FIG. 4 is a flow chart of a method 400 of code deployment with a fallback mechanism. At 402, once the integrated encoding module passes all of the above tests, an automatic construction process will be triggered, where automatic construction can automatically compile and package the integrated encoding module and prepare it for next deployment. Prior to the deployment, a target environment also needs to be configured to satisfy the requirements of the integrated encoding module, including establishing necessary services, databases, and other dependent configurations. This process is referred to as environment configuration 404. At 406, an appropriate deployment strategy further needs to be selected based on the characteristics of the update (e.g., major release, minor update, patch, etc.), where common strategies include blue-green deployment, canary release, rolling update, etc. In the method 400, 402 to 406 involve pre-deployment preparation, can be executed in any suitable sequence, and are not limited to the sequence shown in the figure. After the above preparation items are completed, at 408, deployment is performed based on the selected strategy, the integrated encoding module is deployed to the target environment, and real-time monitoring ensures that the whole deployment process proceeds smoothly. After deployment is completed, the terminal or client terminal after deployment also needs to be tested at 410. If no anomaly is detected at 410, the terminal or client terminal is normal, and the deployment is successful (at 412). If any anomaly is detected at 410, a robust fallback mechanism is activated (at 414). The environment of the terminal or client terminal is restored to its previous stable state, to ensure continuous service for the terminal or client terminal. In an illustrative embodiment, after deployment, feedback may be further collected from end-users and system logs. This feedback is invaluable for future development and deployment periods. The above method 400 ensures that the code deployment is not only efficient and reliable, but also adaptable based on feedback and real-time monitoring.

Figure 5:
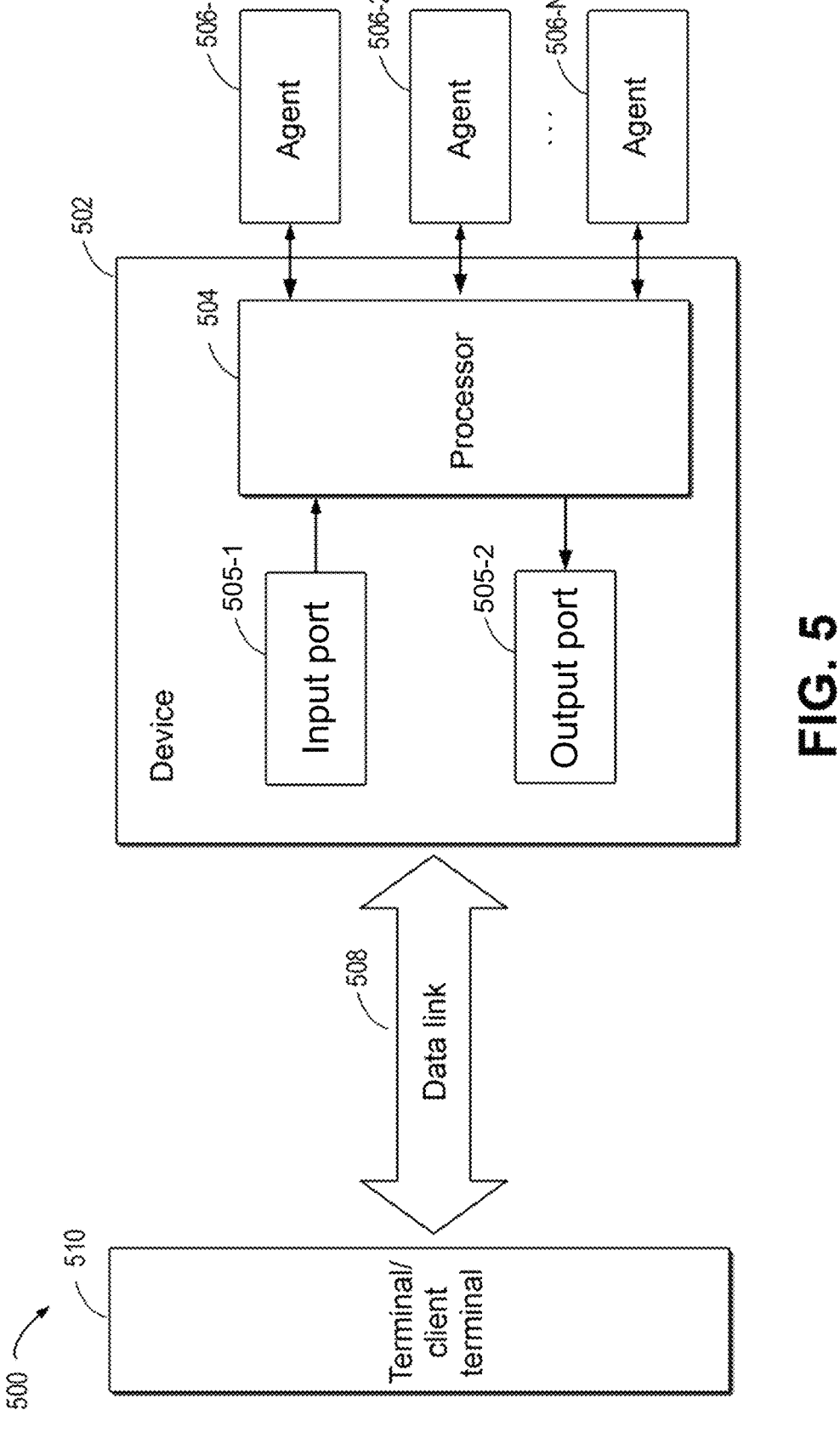
FIG. 5 is a block diagram of an example system comprising an electronic device according to an embodiment of the present disclosure using a scalable multi-agent arrangement for modular software development.

Referring now to FIG. 5, a system 500 comprising an electronic device 502 using a scalable multi-agent arrangement for modular software development according to an embodiment of the present disclosure is described below with reference to FIG. 5. The electronic device 502 according to an embodiment of the present disclosure includes a processor 504, input port 505-1 for receiving input demands, and an output port 505-2 for providing output results. A plurality of demands can be inputted at input port 505-1, and these demands are described in the natural language. The processor 504 is responsible for analyzing and processing the plurality of demands. The processing procedure is shown in FIG. 2, and will not be further described here; after steps such as semantic analysis, clustering, and grouping of the plurality of demands as shown in FIG. 2, the processor 504 may further accurately match a plurality of tasks with a plurality of agents 506-1, . . . , 506-N. The processor 504 is coupled to the plurality of agents 506-1, 506-2, . . . , 506-N, and the results and feedback after the agents complete the tasks are provided to the processor 504, for the processor 504 to perform next processing and subsequent improvements. After the electronic device 502 completes the overall development task, the output results can be outputted from output port 505-2, and the resulting integrated encoding module can be deployed to a terminal or client terminal 510 through a data link 508. The terminal or client terminal 510 may further transfer, through the data link 508, the feedback or further demands to the electronic device 502 through the input port 505-1.

Figure 6:
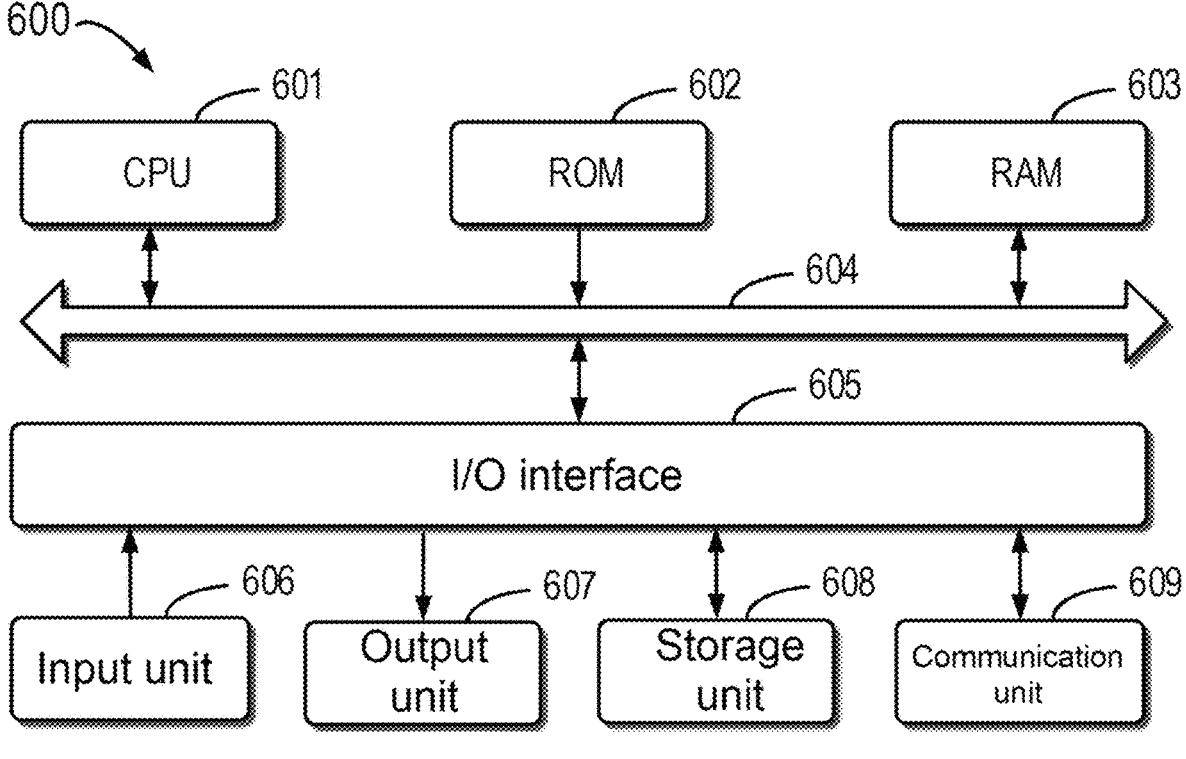
FIG. 6 is a block diagram of a device that can implement multiple embodiments of the present disclosure.

FIG. 6 is a block diagram of an example device 600 that may be configured to implement embodiments of the present disclosure. As shown in the figure, the device 600 includes a computing unit 601, illustratively implemented as at least one central processing unit (CPU), which may execute various appropriate actions and processes in accordance with computer program instructions stored in a read-only memory (ROM) 602 or computer program instructions loaded into a random access memory (RAM) 603 from a storage unit 608. The RAM 603 may further store various programs and data required by operations of the device 600. The computing unit 601, the ROM 602, and the RAM 603 are connected to each other through a bus 604. An input/output (I/O) interface 605 is also connected to the bus 604.

A number of components in the device 600 are connected to the I/O interface 605, including: an input unit 606, such as a keyboard or a mouse; an output unit 607, such as various types of displays or speakers; the storage unit 608, such as a magnetic disk or an optical disk; and a communication unit 609, such as a network card, a modem, or a wireless communication transceiver. The communication unit 609 allows the device 600 to exchange information/data with other devices via a computer network such as the Internet and/or various telecommunication networks.

The computing unit 601 may be various general-purpose and/or special-purpose processing components having processing power and computing power. Some examples of the computing unit 601 include, but are not limited to, the above-noted one or more CPUs, a graphics processing unit (GPU), various special-purpose artificial intelligence (AI) computing chips, various computing units running a machine learning model algorithm, a digital signal processor (DSP), and any appropriate processor, controller, micro-controller, and the like. The computing unit 601 executes various methods and processes described above, such as method 200, 300, or 400. For example, in some embodiments, method 200, 300, or 400 may be embodied as a computer software program that is tangibly included in a machine-readable medium, such as the storage unit 608. In some embodiments, some or all of the computer program may be loaded and/or installed onto the device 600 via the ROM 602 and/or the communication unit 609. When the computer program is loaded into the RAM 603 and executed by the computing unit 601, one or more steps of the method 200, 300, or 400 described above may be executed. Alternatively, in other embodiments, the computing unit 601 may be configured to execute the method 200, 300, or 400 by any other appropriate approach (e.g., by means of firmware).

The functions described herein may at least partially be executed by one or more hardware logic components. For example, non-restrictively, example types of usable hardware logic components include: a field programmable gate array (FPGA), an application specific integrated circuit (ASIC), an application specific standard product (ASSP), a system-on-chip (SOC), a complex programmable logic device (CPLD), and so on.

Program codes for implementing the method of the present disclosure may be provided using any combination of one or more programming languages. The program codes may be provided to the processor or controller of a general-purpose computer, a special-purpose computer, or other programmable data processing apparatuses, such that the program codes, when executed by the processor or controller, cause the functions/operations specified in the flow charts and/or block diagrams to be implemented. The program codes may be completely executed on a machine, partially executed on a machine, partially executed as a separate software package on a machine and partially executed on a remote machine, or completely executed on a remote machine or server.

In the context of the present disclosure, the machine-readable medium may be a tangible medium which may contain or store a program for use by, or use in combination with, an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any appropriate combination of the above. A more specific example of the machine-readable storage medium will include an electrical connection based on one or more pieces of wire, a portable computer disk, a hard disk, a RAM, a ROM, an erasable programmable read-only memory (EPROM or flash memory), an optical fiber, a portable compact disc read-only memory (CD-ROM), an optical storage device, a magnetic storage device, or any appropriate combination of the above. Further, while the operations are depicted in a particular order, this should not be construed as an indication that the operations are required to be executed in the shown particular order or in a sequential order, or that all illustrated operations are required to be executed to achieve desired results. In certain environments, multitasking and parallel processing may be advantageous. Similarly, while a number of specific implementation details are included in the above description, these implementation details should not be construed as limiting the scope of the present disclosure. Some features described in the context of separate embodiments may also be implemented in combination in a single implementation. Conversely, various features described in the context of a single implementation may also be implemented in a plurality of implementations separately or in any appropriate sub-combination.

While the present subject matter has been described in a language specific to the structural features and/or logical actions of the method, it should be understood that the subject matter defined in the appended claims is not necessarily limited to the particular features or actions described above. On the contrary, the particular features and actions described above are merely example forms of implementations of the claims.

What is claimed is:

1. A method, comprising:
determining, using a language model, a plurality of quantitative representations of a plurality of demands described in a natural language;
classifying the plurality of demands by clustering into a plurality of tasks based on the plurality of quantitative representations;
determining, using the language model, a quantitative representation of each task among the plurality of tasks and a quantitative representation of each agent among a plurality of agents;
assigning the plurality of tasks respectively to corresponding agents among the plurality of agents based on the quantitative representation of each task and the quantitative representation of each agent;
combining a plurality of encoding modules generated by the corresponding agents based on completion of the plurality of tasks into a code combination satisfying requirements of the plurality of demands;
deploying the code combination to a target environment; and
designating a fallback mechanism for activation in response to detecting an anomaly after the deployment, the fallback mechanism being configured to restore the target environment to a previous stable state;
wherein combining the plurality of encoding modules comprises:
dynamically selecting a communication protocol based on characteristics and communication requirements of the encoding modules using a scoring function that evaluates suitability of the communication protocol of the encoding modules; and
defining an interface specification for each encoding submodule, the interface specification comprising an expected input, an expected output, and an expected behavior.

2. The method according to claim 1, wherein determining, using the language model, a quantitative representation of each task among the plurality of tasks and a quantitative representation of each agent among a plurality of agents comprises:
performing semantic understanding of a characteristic profile of each agent among the plurality of agents using the language model, to determine the quantitative representation of each agent.

3. The method according to claim 2, wherein the characteristic profile comprises at least one of a historical project, an area of expertise, or a performance parameter.

4. The method according to claim 2, further comprising:
collecting feedback upon completion of the plurality of tasks; and
updating the characteristic profile of the plurality of agents using the feedback.

5. The method according to claim 1, wherein classifying the plurality of demands by clustering into a plurality of tasks based on the plurality of quantitative representations comprises:
grouping the plurality of demands by clustering into one or more clusters based on the plurality of quantitative representations; and
decomposing each cluster among the one or more clusters into a plurality of tasks by identifying key semantic parts and a relationship between the key semantic parts within the cluster.

6. The method according to claim 1, further comprising:
minimizing total project completion time using an optimization algorithm and a constraint condition, the constraint condition comprising an availability of each agent among the plurality of agents and a correlation between the plurality of tasks.

7. The method according to claim 1, further comprising:
validating function and quality of the encoding modules and the code combination.

8. The method according to claim 7, wherein validating the function and quality of the encoding modules and the code combination comprises:
generating a test case using the language model; and
validating the encoding modules and the code combination using the generated test case.

9. An electronic device, comprising:
at least one processor; and
memory coupled to the at least one processor and having instructions stored therein, wherein the instructions, when executed by the at least one processor, cause the electronic device to perform actions comprising:
determining, using a language model, a plurality of quantitative representations of a plurality of demands described in a natural language;
classifying the plurality of demands by clustering into a plurality of tasks based on the plurality of quantitative representations;
determining, using the language model, a quantitative representation of each task among the plurality of tasks and a quantitative representation of each agent among a plurality of agents;
assigning the plurality of tasks respectively to corresponding agents among the plurality of agents based on the quantitative representation of each task and the quantitative representation of each agent;
combining a plurality of encoding modules generated by the corresponding agents based on completion of the plurality of tasks into a code combination satisfying requirements of the plurality of demands;
deploying the code combination to a target environment; and
designating a fallback mechanism for activation in response to detecting an anomaly after the deployment, the fallback mechanism being configured to restore the target environment to a previous stable state;
wherein combining the plurality of encoding modules comprises:
dynamically selecting a communication protocol based on characteristics and communication requirements of the encoding modules using a scoring function that evaluates suitability of the communication protocol of the encoding modules; and
defining an interface specification for each encoding submodule, the interface specification comprising an expected input, an expected output, and an expected behavior.

10. The electronic device according to claim 9, wherein determining, using the language model, a quantitative representation of each task among the plurality of tasks and a quantitative representation of each agent among a plurality of agents comprises:

performing semantic understanding of a characteristic profile of each agent among the plurality of agents using the language model, to determine the quantitative representation of each agent.

11. The electronic device according to claim 10, wherein the characteristic profile comprises at least one of a historical project, an area of expertise, or a performance parameter.

12. The electronic device according to claim 10, wherein the actions further comprise:

collecting feedback upon completion of the plurality of tasks; and updating the characteristic profile of the plurality of agents using the feedback.

13. The electronic device according to claim 9, wherein classifying the plurality of demands by clustering into a plurality of tasks based on the plurality of quantitative representations comprises:

grouping the plurality of demands by clustering into one or more clusters based on the plurality of quantitative representations; and decomposing each cluster among the one or more clusters into a plurality of tasks by identifying key semantic parts and a relationship between the key semantic parts within the cluster.

14. The electronic device according to claim 9, wherein the actions further comprise:

minimizing total project completion time using an optimization algorithm and a constraint condition, the constraint condition comprising an availability of each agent among the plurality of agents and a correlation between the plurality of tasks.

15. The electronic device according to claim 9, wherein the actions further comprise:

validating function and quality of the encoding modules and the code combination.

16. The electronic device according to claim 15, wherein validating the function and quality of the encoding modules and the code combination comprises:

generating a test case using the language model; and validating the encoding modules and the code combination using the generated test case.

17. A computer program product comprising a non-transitory computer-readable medium having machine-executable instructions stored therein, wherein the machine-executable instructions, when executed by a machine, cause the machine to perform actions comprising:

determining, using a language model, a plurality of quantitative representations of a plurality of demands described in a natural language;

classifying the plurality of demands by clustering into a plurality of tasks based on the plurality of quantitative representations;

determining, using the language model, a quantitative representation of each task among the plurality of tasks and a quantitative representation of each agent among a plurality of agents;

assigning the plurality of tasks respectively to corresponding agents among the plurality of agents based on the quantitative representation of each task and the quantitative representation of each agent;

combining a plurality of encoding modules generated by the corresponding agents based on completion of the plurality of tasks into a code combination satisfying requirements of the plurality of demands;

deploying the code combination to a target environment; and designating a fallback mechanism for activation in response to detecting an anomaly after the deployment, the fallback mechanism being configured to restore the target environment to a previous stable state;

wherein combining the plurality of encoding modules comprises:

dynamically selecting a communication protocol based on characteristics and communication requirements of the encoding modules using a scoring function that evaluates suitability of the communication protocol of the encoding modules; and defining an interface specification for each encoding submodule, the interface specification comprising an expected input, an expected output, and an expected behavior.

18. The computer program product according to claim 17, wherein determining, using the language model, a quantitative representation of each task among the plurality of tasks and a quantitative representation of each agent among a plurality of agents comprises:

performing semantic understanding of a characteristic profile of each agent among the plurality of agents using the language model, to determine the quantitative representation of each agent.

19. The computer program product according to claim 18, wherein the characteristic profile comprises at least one of a historical project, an area of expertise, or a performance parameter.

20. The computer program product according to claim 17, wherein classifying the plurality of demands by clustering into a plurality of tasks based on the plurality of quantitative representations comprises:

grouping the plurality of demands by clustering into one or more clusters based on the plurality of quantitative representations; and decomposing each cluster among the one or more clusters into a plurality of tasks by identifying key semantic parts and a relationship between the key semantic parts within the cluster.

* * * * *